United States Patent
Hwang et al.

(10) Patent No.: US 12,192,319 B2
(45) Date of Patent: Jan. 7, 2025

(54) APPARATUS AND METHOD FOR MODULAR MULTIPLICATION RESISTANT TO SIDE-CHANNEL ATTACK

(71) Applicant: Samsung Electronics Co., Ltd., Suwon-si (KR)

(72) Inventors: Hyosun Hwang, Bucheon-si (KR); Gisoo Seo, Suwon-si (KR); Jonghoon Shin, Hwaseong-si (KR); Hyojoon Jin, Hwaseong-si (KR); Ingoo Heo, Yongin-si (KR); Jinsu Hyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 615 days.

(21) Appl. No.: 17/467,546

(22) Filed: Sep. 7, 2021

(65) Prior Publication Data
US 2022/0231832 A1 Jul. 21, 2022

(30) Foreign Application Priority Data
Jan. 20, 2021 (KR) .................. 10-2021-0008263

(51) Int. Cl.
*G06F 21/72* (2013.01)
*G06F 7/58* (2006.01)
(Continued)

(52) U.S. Cl.
CPC .............. *H04L 9/004* (2013.01); *G06F 7/588* (2013.01); *G06F 17/11* (2013.01); *G06F 21/556* (2013.01); *G06F 21/72* (2013.01);
*G06F 21/755* (2017.08); *G06F 21/78* (2013.01); *H04L 9/0869* (2013.01); *G06F 7/722* (2013.01); *G06F 21/55* (2013.01)

(58) Field of Classification Search
CPC ......... H04L 9/004; H04L 9/0869; H04L 9/08; G06F 21/78; G06F 21/72; G06F 21/75; G06F 21/55; G06F 21/556; G06F 17/11; G06F 2207/7219; G06F 2207/5561; G06F 2207/5354; G06F 7/58; G06F 7/588;
(Continued)

(56) References Cited

U.S. PATENT DOCUMENTS 5,848,160 A * 12/1998 Cai .................. H04B 1/707
380/46
8,139,763 B2 3/2012 Boscher et al.
(Continued)

FOREIGN PATENT DOCUMENTS

KR 1020070049823 A 5/2007
KR 101513012 B1 4/2015
(Continued)

*Primary Examiner* — Shaqueal D Wade-Wright
(74) *Attorney, Agent, or Firm* — Muir Patent Law, PLLC

(57) ABSTRACT

A device includes a random number generator configured to generate a random number, a memory configured to store at least one lookup table, and a processing circuit configured to generate a generator based on the random number, create the at least one lookup table based on the generator, and write the created at least one lookup table to the memory, wherein the processing circuit is configured to access the memory based on a first input and a second input, and generate a result of a modular multiplication of the first input by the second input based on the at least one lookup table.

17 Claims, 12 Drawing Sheets

(51) Int. Cl.
  *G06F 17/11*   (2006.01)
  *G06F 21/55*   (2013.01)
  *G06F 21/75*   (2013.01)
  *G06F 21/78*   (2013.01)
  *H04L 9/00*   (2022.01)
  *H04L 9/08*   (2006.01)
  *G06F 7/72*   (2006.01)

(58) Field of Classification Search
  CPC ...... G06F 7/4988; G06F 7/5057; G06F 7/544; G06F 7/72; G06F 7/722
  See application file for complete search history.

(56) References Cited

U.S. PATENT DOCUMENTS

| | | | |
|---|---|---|---|
| 8,422,671 B2 | 4/2013 | Yoon et al. | |
| 9,164,732 B2 | 10/2015 | Lee et al. | |
| 10,133,554 B2 | 11/2018 | Kaluzhny | |
| 2004/0133788 A1* | 7/2004 | Perkins | G06F 7/723 713/189 |
| 2007/0294508 A1* | 12/2007 | Sussman | G06F 7/582 712/E9.017 |
| 2010/0023572 A1* | 1/2010 | Dupaquis | G06F 7/726 708/492 |
| 2016/0239267 A1* | 8/2016 | Bos | G06F 7/723 |
| 2018/0183576 A1* | 6/2018 | Wang | H04L 9/0631 |

FOREIGN PATENT DOCUMENTS

| | | |
|---|---|---|
| KR | 101891898 B1 | 8/2018 |
| KR | 1020200107739 A | 9/2020 |

* cited by examiner

$$\overbrace{(a_0 + a_1 X + a_2 X^2 + a_3 X^3)}^{P1} \cdot \overbrace{(b_0 + b_1 X + b_2 X^2 + b_3 X^3)}^{P2} = \overbrace{c_0 + c_1 X + c_2 X^2 + c_3 X^3}^{P3}$$

$$c_0 = a_0{}^*b_0 + a_1{}^*b_3 + a_2{}^*b_2 + a_3{}^*b_1 \bmod p$$
$$c_1 = a_0{}^*b_1 + a_1{}^*b_0 + a_2{}^*b_3 + a_3{}^*b_2 \bmod p$$
$$c_2 = a_0{}^*b_2 + a_1{}^*b_1 + a_2{}^*b_0 + a_3{}^*b_3 \bmod p$$
$$c_3 = a_0{}^*b_3 + a_1{}^*b_2 + a_2{}^*b_1 + a_3{}^*b_0 \bmod p$$

|  | $a_0$ | $a_1$ | $a_2$ | $a_3$ |
|---|---|---|---|---|
| $b_0$ | $a_0{}^*b_0 \bmod p$ | $a_1{}^*b_0 \bmod p$ | $a_2{}^*b_0 \bmod p$ | $a_3{}^*b_0 \bmod p$ |
| $b_1$ | $a_0{}^*b_1 \bmod p$ | $a_1{}^*b_1 \bmod p$ | $a_2{}^*b_1 \bmod p$ | $a_3{}^*b_1 \bmod p$ |
| $b_2$ | $a_0{}^*b_2 \bmod p$ | $a_1{}^*b_2 \bmod p$ | $a_2{}^*b_2 \bmod p$ | $a_3{}^*b_2 \bmod p$ |
| $b_3$ | $a_0{}^*b_3 \bmod p$ | $a_1{}^*b_3 \bmod p$ | $a_2{}^*b_3 \bmod p$ | $a_3{}^*b_3 \bmod p$ |

FIG. 11

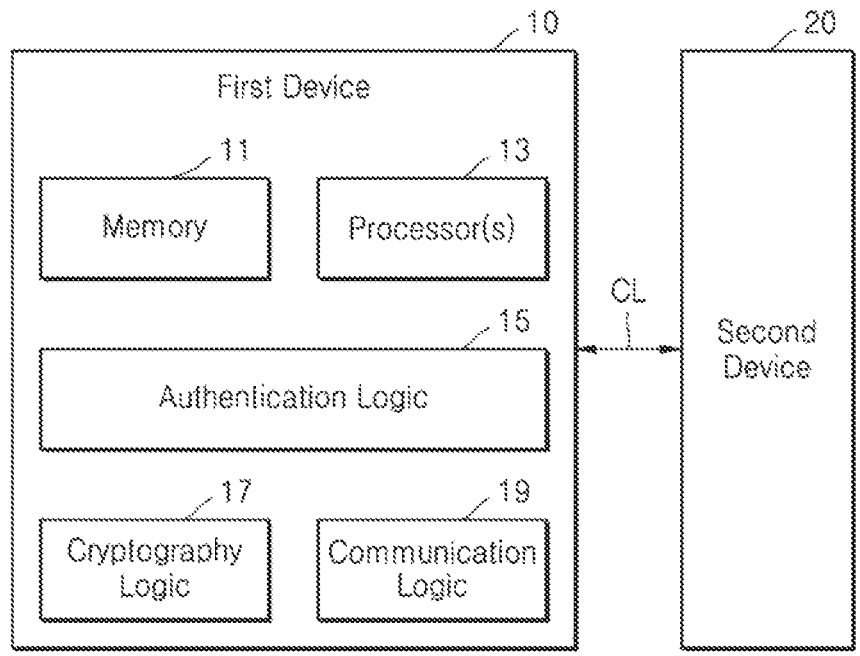

APPARATUS AND METHOD FOR MODULAR MULTIPLICATION RESISTANT TO SIDE-CHANNEL ATTACK

CROSS-REFERENCE TO RELATED APPLICATION

This application is based on and claims priority under 35 U.S.C. § 119 to Korean Patent Application No. 10-2021-0008263, filed on Jan. 20, 2021, in the Korean Intellectual Property Office, the disclosure of which is incorporated by reference herein in its entirety.

BACKGROUND

The inventive concept relates to modular multiplication, and specifically, to an apparatus and method for modular multiplication resistant to side-channel attacks.

A side-channel attack (SCA) may attempt to hack a secure operation based on power consumption and an electromagnetic field generated in a device. The device may perform security operations based on cryptography algorithms, but a more effective countermeasure against side-channel attacks may be required since the side-channel attacks are gradually advanced, that is, using responses to faults intentionally applied to the integrated circuit, using machine learning based on parameters measured from the integrated circuit, and the like.

SUMMARY

The inventive concept provides an apparatus and method for cryptographic operation resistant to side-channel attacks.

According to an aspect of the inventive concept, there is provided a device including a random number generator configured to generate a random number; a memory configured to store at least one lookup table; and a processing circuit configured to generate a generator based on the random number, create the at least one lookup table based on the generator, and write the at least one lookup table to the memory, wherein the processing circuit is configured to access the memory based on a first input and a second input, and generate a result of a modular multiplication of the first input by the second input based on the at least one lookup table.

According to another aspect of the inventive concept, there is provided a method for modular multiplication of a first input and a second input, the method including: generating a random number; generating a generator based on the random number; creating at least one lookup table based on the generator; writing the at least one lookup table to a memory; accessing the memory based on the first input and the second input; and generating a result of the modular multiplication based on the at least one lookup table.

According to another aspect of the inventive concept, there is provided a non-transitory computer-readable recording medium including instructions executed by at least one processor is provided. The instructions cause the at least one processor to perform operations for modular multiplication of a first input and a second input, wherein the operations include: generating a generator based on a random number; creating at least one lookup table based on the generator; writing the at least one lookup table to a memory; accessing the memory based on the first input and the second input; and generating a result of the modular multiplication based on the at least one lookup table.

BRIEF DESCRIPTION OF THE DRAWINGS

Embodiments of the inventive concept will be more clearly understood from the following detailed description taken in conjunction with the accompanying drawings in which like numerals refer to like elements throughout. In the drawings:

FIGS. 5A to 5C are diagrams illustrating examples of a plurality of candidate generators, according to an exemplary embodiment of the inventive concept;

FIG. 10 shows an example of a cryptographic operation, according to an exemplary embodiment of the inventive concept;

FIG. 11 is a block diagram showing devices, according to an exemplary embodiment of the inventive concept.

DETAILED DESCRIPTION OF THE EMBODIMENTS

Figure 1:
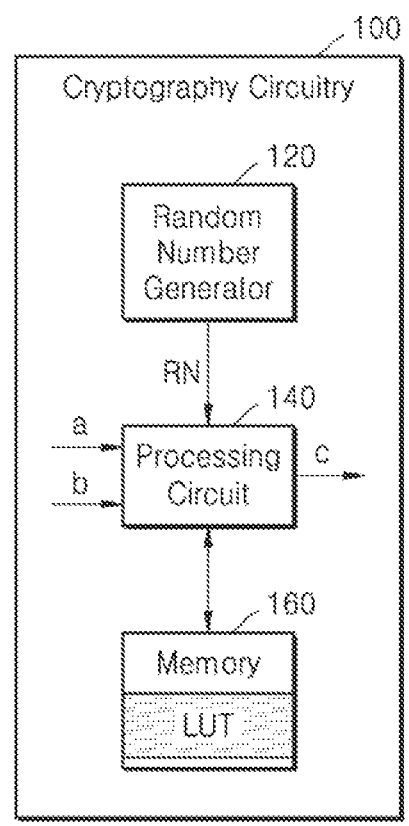
FIG. 1 is a block diagram showing cryptography circuitry, according to an exemplary embodiment of the inventive concept.

FIG. 1 is a block diagram showing cryptography circuitry 100 according to an exemplary embodiment of the inventive concept. The cryptography circuitry 100 may be included in any device that performs a secure operation. For example, the cryptography circuitry 100 may be included in stationary computing systems such as desktop computers, servers, kiosks, and the like, portable computing systems such as laptop computers, smartphones, tablet PCs, and the like, wearable devices such as smart watches, smart glasses, smart bands, and the like, and personal authentication devices such as a credit card or a personal identification number (PIN), and the like. In some embodiments, the cryptography circuitry 100 may be included in a secure region protected from external attacks, and may be integrated into a single die and/or a single semiconductor package. As shown in FIG. 1, the cryptography circuitry 100 may include a random number generator 120, a processing circuit 140, and a memory 160.

The cryptography circuitry 100 may perform a cryptographic operation and/or a security operation. In some embodiments, the cryptography circuitry 100 may generate or utilize various cryptographic keys (e.g., a symmetric key, an asymmetric key) for encryption, decryption, signing, and/or signature verification. In some embodiments, the cryptography circuitry 100 may enable establishing a secure connection with another remote device over a communication link. In some embodiments, the cryptography circuitry 100 may enable the establishment of a trusted execution environment or security domain that stores data or performs various functions. Herein, public key-based encryption will be mainly referred to as an example of an encryption operation, but exemplary embodiments of the inventive concept are not limited thereto.

Multiple modular multiplications may be performed in cryptography. For example, in Rivest-Shamir-Adleman (RSA) encryption or elliptic curve cryptography (ECC), which is a public key-based encryption method, modular multiplications for 256-bit to 8192-bit values may be performed. Despite the inputs and outputs of modular multiplication with a relatively long length, RSA encryption and ECC are vulnerable to attacks using quantum computers. Accordingly, in order to combat attacks using quantum computers, post-quantum cryptography (PQC) has been proposed, and the U.S. National Institute of Standards and Technology (NIST) is in the process of standardizing PQC.

In PQC, modular multiplications may be performed on values having a relatively small length, and for example, modular multiplications for values of 32 bits or less may be performed. Accordingly, modular multiplication may be vulnerable to side-channel attacks, and modular multiplication that is resistant to side-channel attacks in PQC may be important. The random number generator 120, the processing circuit 140, and the memory 160 may perform modular multiplication of the first input a and the second input b, and may generate a result c of the modular multiplication. As will be described later, the random number generator 120, the processing circuit 140, and the memory 160 may consume equal power independently of the values of the first input a and the second input b to generate the result c of modular multiplication. Accordingly, modular multiplication and cryptographic operations including the same may be resistant to side-channel attacks. In addition, a generator for modular multiplication may be randomly selected, and accordingly, a modular multiplication and a cryptographic operation including the same may have more enhanced resistance to side-channel attacks. As a result, the cryptography circuitry 100 may provide PQC having an improved security level.

The random number generator 120 may generate a random number RN and may provide the random number RN to the processing circuit 140. The random number generator 120 may generate a random number RN in an arbitrary manner. For example, the random number generator 120 may include a true random number generator and/or a pseudo random number generator, and may generate a random number RN having a length required by the processing circuit 140. In some embodiments, the random number generator 120 may generate a random number RN in response to the request of the processing circuit 140. Further, in some embodiments, the cryptography circuitry 100 may include a plurality of processing circuits, and the random number generator 120 may commonly provide a random number RN to two or more processing circuits. As will be described later, the random number RN may be used to generate a generator, or may be used to generate an input for modular multiplication (e.g., the second input b). Herein, the random number RN used to generate the generator may be referred to as a first random number, and the random number RN used to generate the input of modular multiplication may be referred to as a second random number. In some embodiments, the first random number and the second random number may be respectively generated by different random number generators.

The processing circuit 140 may receive a first input a and a second input b, and may generate a result c of a modular multiplication from the first input a and the second input b. For example, the processing circuit 140 may perform modular multiplication using the first input a and the second input b to generate the result c. The first input a and the second input b may be arbitrary multi-bit values that are required for an operation in cryptographic operation. For example, as will be described later with reference to FIG. 10, the first input a may correspond to a value based on a secret key or a private key, and the second input b may correspond to a value based on a random number (i.e., a second random number). Further, the processing circuit 140 may receive a random number RN from the random number generator 120 and may access the memory 160. The processing circuit 140 may generate a generator based on the random number RN, and may create at least one lookup table LUT based on the generator. An example of the operation of the processing circuit 140 will be described later with reference to FIG. 2.

The processing circuit 140 may have any structure that performs the above-described operation. For example, the processing circuit 140 may include at least one programmable component (e.g., a processor), such as a central processing unit (CPU), a digital signal processor (DSP), a graphics processing unit (GPU), a neural network processing unit (NPU), and the like, and may include reconfigurable components such as field programmable gate arrays (FPGAs), and the like, and may include a component that provides a fixed function, such as an intellectual property (IP) core. As used herein, IP cores may self-contained discrete units that provide a macro function to the system. Those skilled in the art will appreciate that the disclosed IP cores are physically implemented by electronic (or optical) circuits, such as logic circuits, discrete components, microprocessors, hard-wired circuits, memory elements, wiring connections, buses, communication links, and the like, which may be formed using semiconductor-based fabrication techniques or other manufacturing technologies.

The memory 160 may be accessed by the processing circuit 140 and may include at least one lookup table LUT. At least one lookup table LUT may be created and written to the memory 160 by the processing circuit 140, and may be referenced by the processing circuit 140 to generate the result c of the modular multiplication from the first input a and the second input b. In some embodiments, while generating the result c of the modular multiplication, the memory 160 may be accessed by the processing circuit 140 a constant number of times independently of the values of the first input a and the second input b, and thus equal power consumption may be achieved.

The memory 160 may be any storage medium that stores at least one lookup table LUT. For example, the memory 160 may include a volatile memory such as dynamic random access memory (DRAM), static random access memory (SRAM), and the like, and may also include non-volatile memory such as flash memory, resistive random access memory (RRAM), and the like. Also, the memory 160 may include registers including a plurality of latches.

Figure 2:
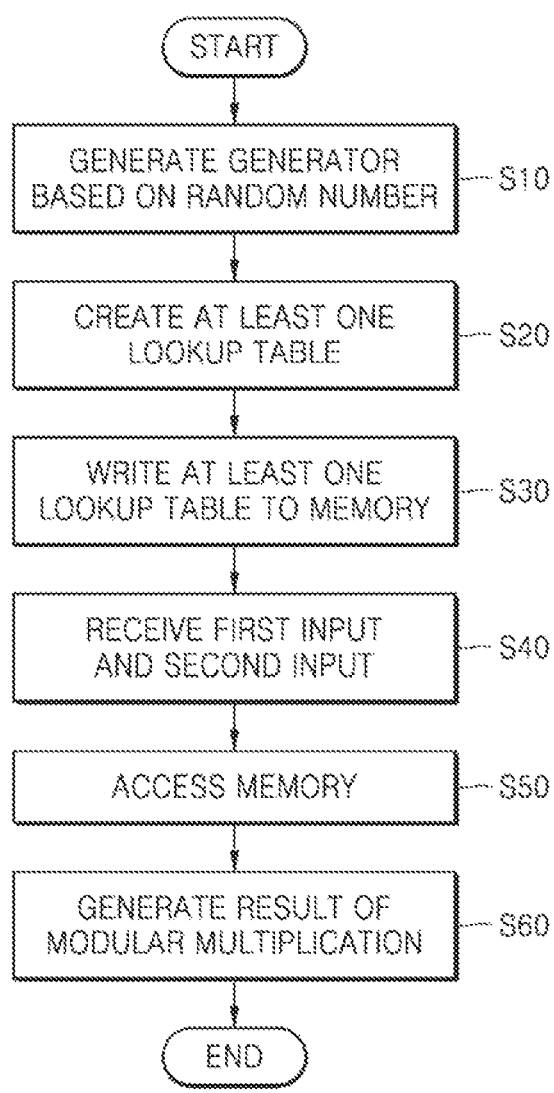
FIG. 2 is a flowchart showing a method for modular multiplication, according to an exemplary embodiment of the inventive concept.

FIG. 2 is a flowchart showing a method for modular multiplication according to an exemplary embodiment of the inventive concept. As shown in FIG. 2, the method of FIG. 2 may include a plurality of operations S10 to S60. In some embodiments, the method of FIG. 2 may be performed by the processing circuit 140 of FIG. 1. For example, at least one processor may access a non-transitory computer-readable recording medium (e.g., a semiconductor memory device, an optical disk, a magnetic disk, etc.) storing a series of instructions, and may perform the method of FIG. 2 by executing the series of instructions. Hereinafter, FIG. 2 will be described with reference to FIG. 1.

Referring to FIG. 2, a generator may be generated based on a random number RN in operation S10. For example, the random number generator 120 may generate a random number RN, and the processing circuit 140 may generate a generator based on the random number RN. Public key-based encryption may use modular multiplication in finite field or Galois field GF(p). The characteristic of the finite field GF(p) may be a prime number p, and GF(p) may be defined by [Equation 1] below.

$$GF(p) = \{g^i \bmod p; i = 0, \ldots, p-2\} \cup \{0\} \quad \text{[Equation 1]}$$

[Equation 1] may mean that the elements of the finite field GF(p) excluding zero must always have i expressed as "$g^i$ mod p". Accordingly, the generator g may depend on the prime number p. The processing circuit 140 may generate a generator g based on the random number RN, and even in modular multiplications where the input of modular multiplication, for example, the first input a corresponding to the secret key, is the same, the modular multiplications may consume different power and consequently reduce predictability. An example of operation S10 will be described later with reference to FIG. 3.

In operation S20, at least one lookup table LUT may be created. For example, the processing circuit 140 may create at least one lookup table LUT based on the generator g generated in operation S10. Modular multiplication of the first input a and the second input b may be expressed as [Equation 2] below.

$$c = a * b \bmod p = \mathrm{Exp}[\mathrm{Log}[a] + \mathrm{Log}[b]] \quad \text{[Equation 2]}$$

In addition, in [Equation 2], the function Exp and the function Log may be defined as in [Equation 3] and [Equation 4] below.

$$\mathrm{Exp}[i] = g^i \bmod p \quad \text{[Equation 3]}$$

$$\mathrm{Log}[g^i \bmod p] = i \quad \text{[Equation 4]}$$

In [Equation 3], the output of the function Exp may have a value of 1 to (p−1) (1≤Exp[i]≤p−1), and in [Equation 4], the output of the function Log may have a value of 0 to (p−2) (0≤Log[$g^i$ mod p]≤p−2). For example, when the prime number p is 7 and the generator g is 3, the value of the modular multiplication "3*4 mod 7" of 3 and 4 may be 5. According to [Equation 4], Log[3] and Log[4] may be 1 and 4, respectively, and according to [Equation 2] and [Equation 3], Exp[1+4] is 5, which can be equal to 5 calculated earlier. Accordingly, the processing circuit 140 may create at least one lookup table LUT and the at least one lookup table LUT may include a lookup table (which may be referred to herein as the first lookup table) including pairs of input and output of the function Log and a lookup table (which may be referred to herein as a second lookup table) including pairs of input and output of the function Exp, and the processing circuit 140 may perform modular multiplication based on the created lookup tables.

In operation S30, at least one lookup table LUT may be written to the memory 160. For example, the processing circuit 140 may write at least one lookup table LUT created in operation S20 to the memory 160. Accordingly, preparation for performing modular multiplication on a given prime number p and generator g may be completed. At least one lookup table LUT stored in the memory 160 may be used for at least one modular multiplication, and the update timing of the at least one lookup table LUT may be determined in various ways. For example, the processing circuit 140 may perform operations S10 to S30 per one modular multiplication, perform operations S10 to S30 in units of a predefined number of modular multiplications, and perform operations S10 to S30 in a single cryptographic operation unit including modular multiplications. Further, the processing circuit 140 may perform operations S10 to S30 when power is supplied to the cryptography circuitry 100 or a predefined event such as an idle state occurs.

In operation S40, a first input a and a second input b may be received. For example, as described above with reference to FIG. 1, the cryptographic operation may include a plurality of modular multiplications, and the processing circuit 140 may receive a first input a and a second input b for modular multiplication of the first input a and the second input b.

In operation S50, the memory 160 may be accessed. For example, the processing circuit 140 may access the memory 160 based on the first input a and the second input b received in operation S40. The processing circuit 140 may access the memory 160 a predetermined number of times independently of values of the first input a and the second input b. Accordingly, the power consumed during modular multiplication may be equal despite variations in the first input a and the second input b. Examples of at least one lookup table LUT stored in the memory 160 will be described later with reference to FIGS. 6, 7A, and 7B, and an example of operation S50 will be described later with reference to FIG. 8.

In operation S60, the result c of the modular multiplication may be generated. For example, the processing circuit 140 may generate a result c of the modular multiplication based on values obtained from at least one lookup table LUT by accessing the memory 160 in operation S50.

Figure 3:
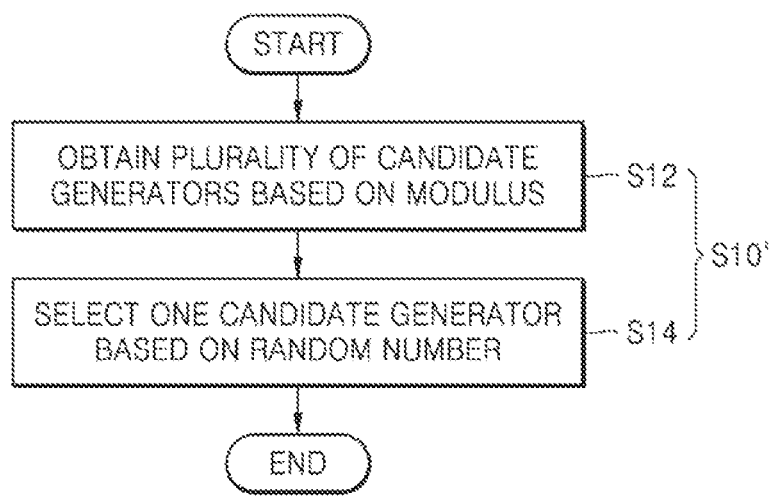
FIG. 3 is a flowchart showing a method for modular multiplication, according to an exemplary embodiment of the inventive concept.

FIG. 3 is a flowchart showing a method for modular multiplication according to an exemplary embodiment of the inventive concept. Specifically, the flowchart of FIG. 3 shows an example of operation S10 of FIG. 2. As described above with reference to FIG. 2, a generator may be generated based on a random number RN in operation S10' of FIG. 3. As shown in FIG. 3, operation S10' may include operations S12 and S14, and FIG. 3 will be described below with reference to FIG. 1.

Referring to FIG. 3, in operation S12, a plurality of candidate generators may be obtained based on a modulus. For example, as described above with reference to FIG. 2, the cryptographic operation may include modular multiplication with a prime number p as a modulus, and there may be a plurality of candidate generators that are smaller than the prime number p and satisfy [Equation 1]. For example, each of the plurality of candidate generators may correspond to generator g such that a finite field GF(p) is a union of {$g^i$ mod p; i=0, . . . , p−2} and {0}. The processing circuit 140 may acquire a plurality of candidate generators depending on the prime number p in various ways. For example, the processing circuit 140 may sequentially calculate a plurality of candidate generators based on the prime number p, and as will be described later with reference to FIGS. 4 and 8, obtain a plurality of generators by accessing a memory (e.g., memory 160 in FIG. 1) in which a plurality of candidate generators are stored. Examples of a plurality of candidate generators will be described later with reference to FIGS. 5A to 5C.

In operation S14, one candidate generator may be selected based on the random number RN. For example, the processing circuit 140 may select one of a plurality of candidate generators obtained in operation S12 based on a random number RN, and use the selected candidate generator g to create at least one lookup table LUT. Accordingly, the generator g may be selected at random, and the predictability of a side-channel attack is significantly reduced. In some embodiments, the processing circuit 140 may calculate a generator g from the modulus and the random number RN based on a predefined function, differently from that shown in FIG. 3. The generator g may be changed based on a random number RN.

Figure 4:
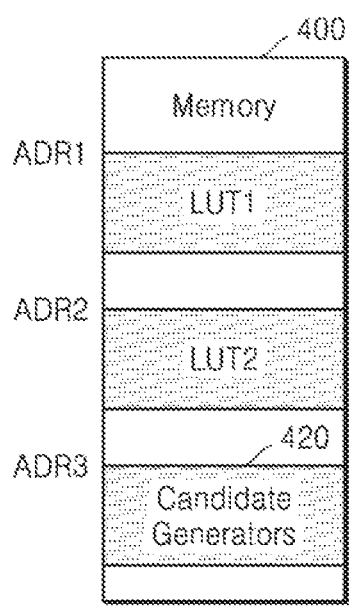
FIG. 4 is a block diagram showing a memory, according to an exemplary embodiment of the inventive concept.

FIG. 4 is a block diagram illustrating a memory 400 according to an exemplary embodiment of the inventive concept. Specifically, the block diagram of FIG. 4 is an example of the memory 160 of FIG. 1 and shows data stored in the memory 400.

Referring to FIG. 4, the memory 400 may include a first lookup table LUT1 and a second lookup table LUT2, and may include a plurality of candidate generators 420. For example, as shown in FIG. 4, the first lookup table LUT1 may be stored in an area corresponding to the first address ADR1, and the second lookup table LUT2 may be stored in an area corresponding to the second address ADR2, and the plurality of candidate generators 420 may be stored in an area corresponding to the third address ADR3. In some embodiments, different from that shown in FIG. 4, at least some of the first lookup table LUT1, the second lookup table LUT2, and the plurality of candidate generators 420 may be stored in a memory other than the memory 400. For example, the first lookup table LUT1 and the second lookup table LUT2 may be stored in a volatile memory device such as DRAM, SRAM, or the like, and moreover, the plurality of candidate generators 420 may be stored in a nonvolatile memory device such as a flash memory or ROM.

The first lookup table LUT1 may include, as entries, pairs of inputs and outputs of the function Log defined in [Equation 4]. That is, in [Equation 4] defined by the generator g and the prime number p, the first lookup table LUT1 may include pairs of an input corresponding to "$g^i$ mod p" and an output corresponding to i. The input of the function Log, that is, "$g^i$ mod p", may have one of (p−1) different values, and accordingly, the first lookup table LUT1 may include (p−1) entries. The processing circuit 140 may obtain outputs of a function Log corresponding to the first input a and the second input b of the modular multiplication from the first look-up table LUT1. An example of the first lookup table LUT1 will be described later with reference to FIG. 6.

The second lookup table LUT2 may include, as entries, pairs of inputs and outputs of the function Exp defined in [Equation 3]. That is, in [Equation 3] defined by the generator g and the prime number p, the second lookup table LUT2 may include pairs of an input corresponding to i and an output corresponding to "$g^i$ mod p". As defined in [Equation 1], the input of the function Exp, that is, i, may have one of (p−1) different values, and accordingly, the second lookup table LUT2 may include (p−1) entries. In some embodiments, the second lookup table LUT2 may include a number of entries different from (p−1). The processing circuit 140 may obtain an output of a function Exp corresponding to values calculated from values obtained from the first lookup table LUT1 and from the second lookup table LUT2, and generate a value obtained from the second lookup table LUT2 as a result c of modular multiplication. Examples of the second lookup table LUT2 will be described later with reference to FIGS. 7A and 7B.

The memory 400 may store a plurality of candidate generators. For example, in a cryptographic operation, the modulus of modular multiplication may be predefined as a prime number p, and a plurality of candidate generators depending on the prime number p may also be calculated in advance based on [Equation 1]. Among the algorithms being discussed in PQC, CRYSTALS-KYBER may define the value of the prime number p as 3329 (p=3329), and Falcon may define the value of the prime number p as 12289 (p=12289), and CRYSTALS-Dilithium may define a prime value of p as 8380417 (p=8380417).

Figure 5A:
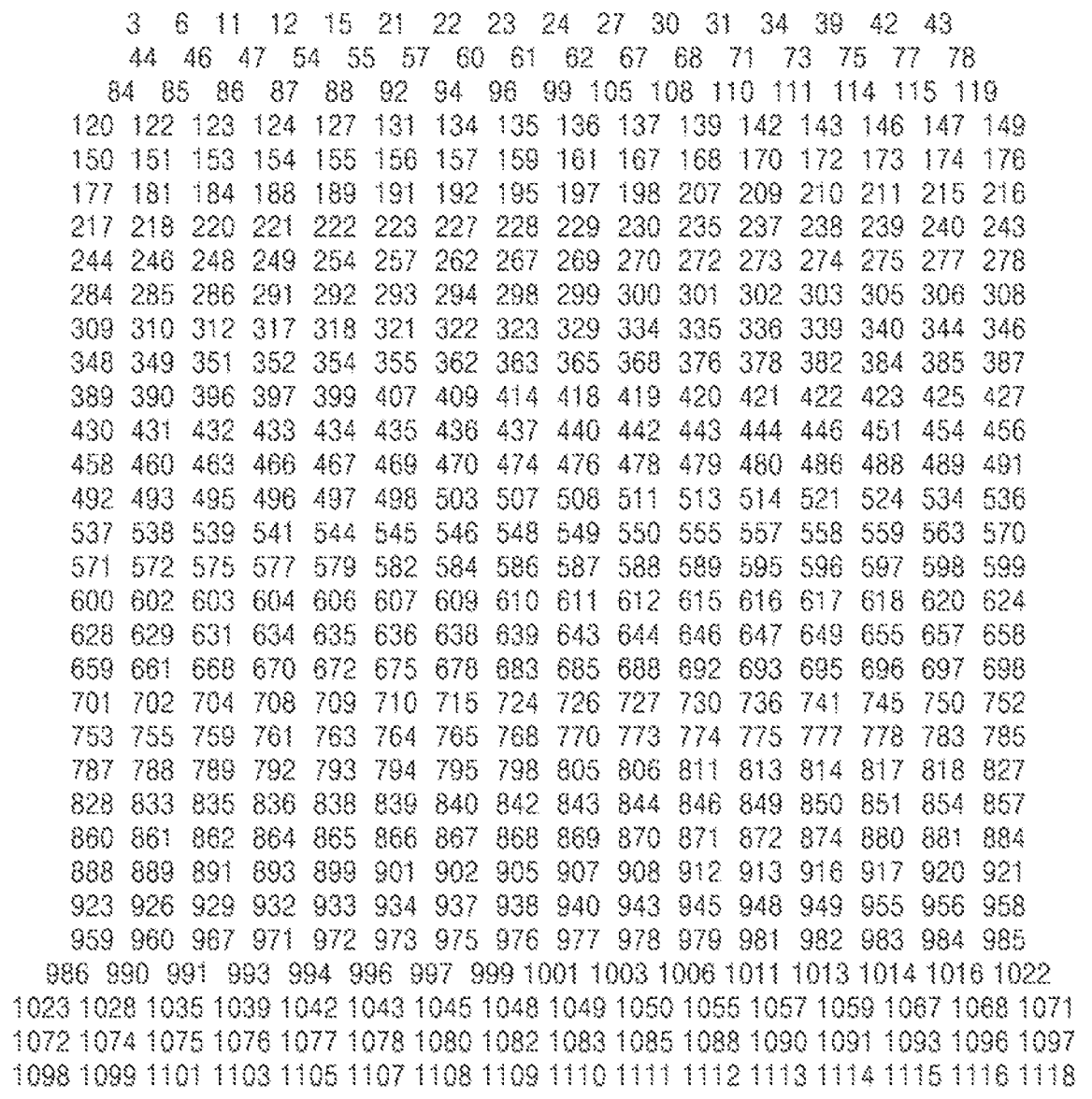
Figure 5B:
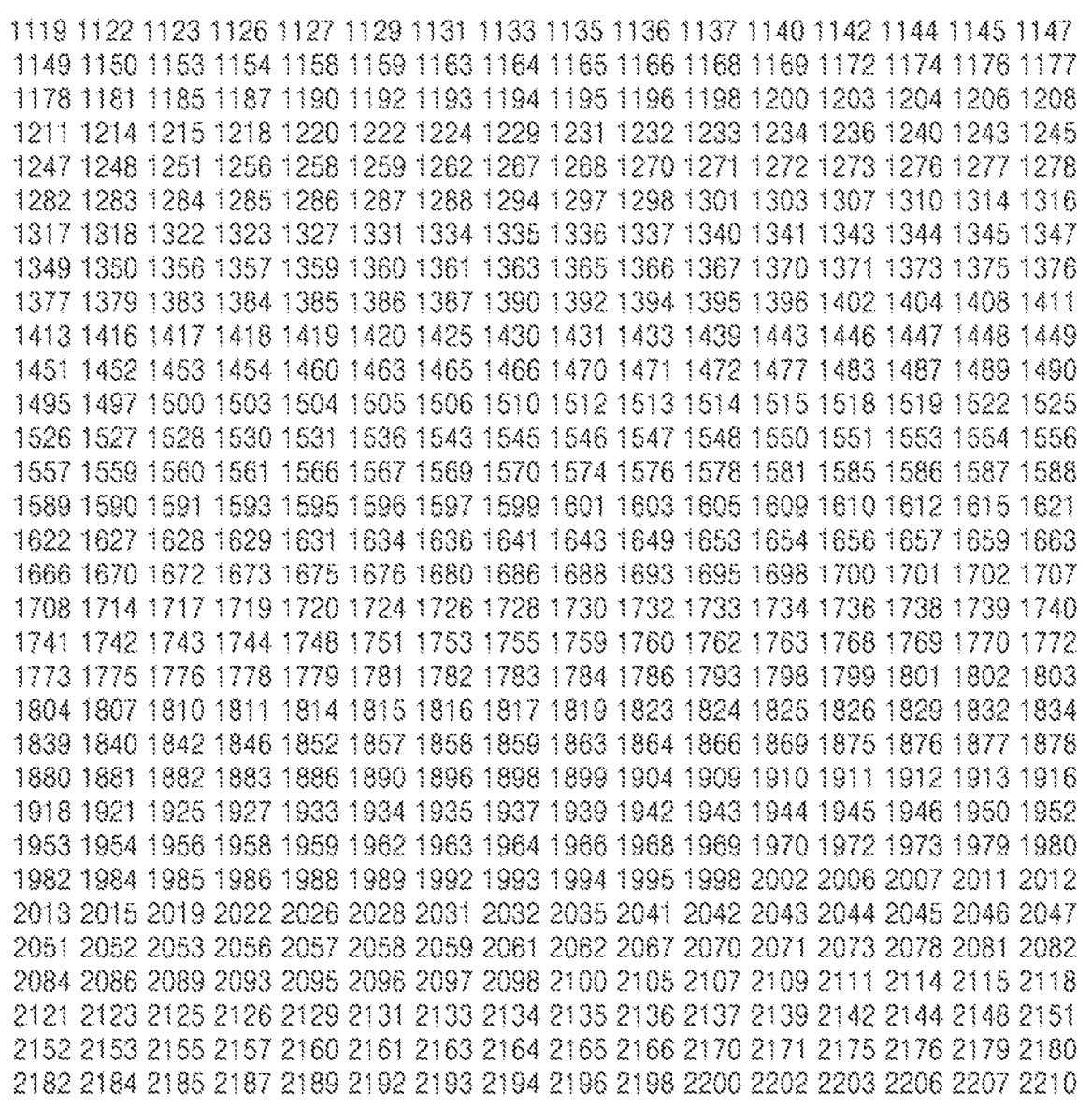
Figure 5C:
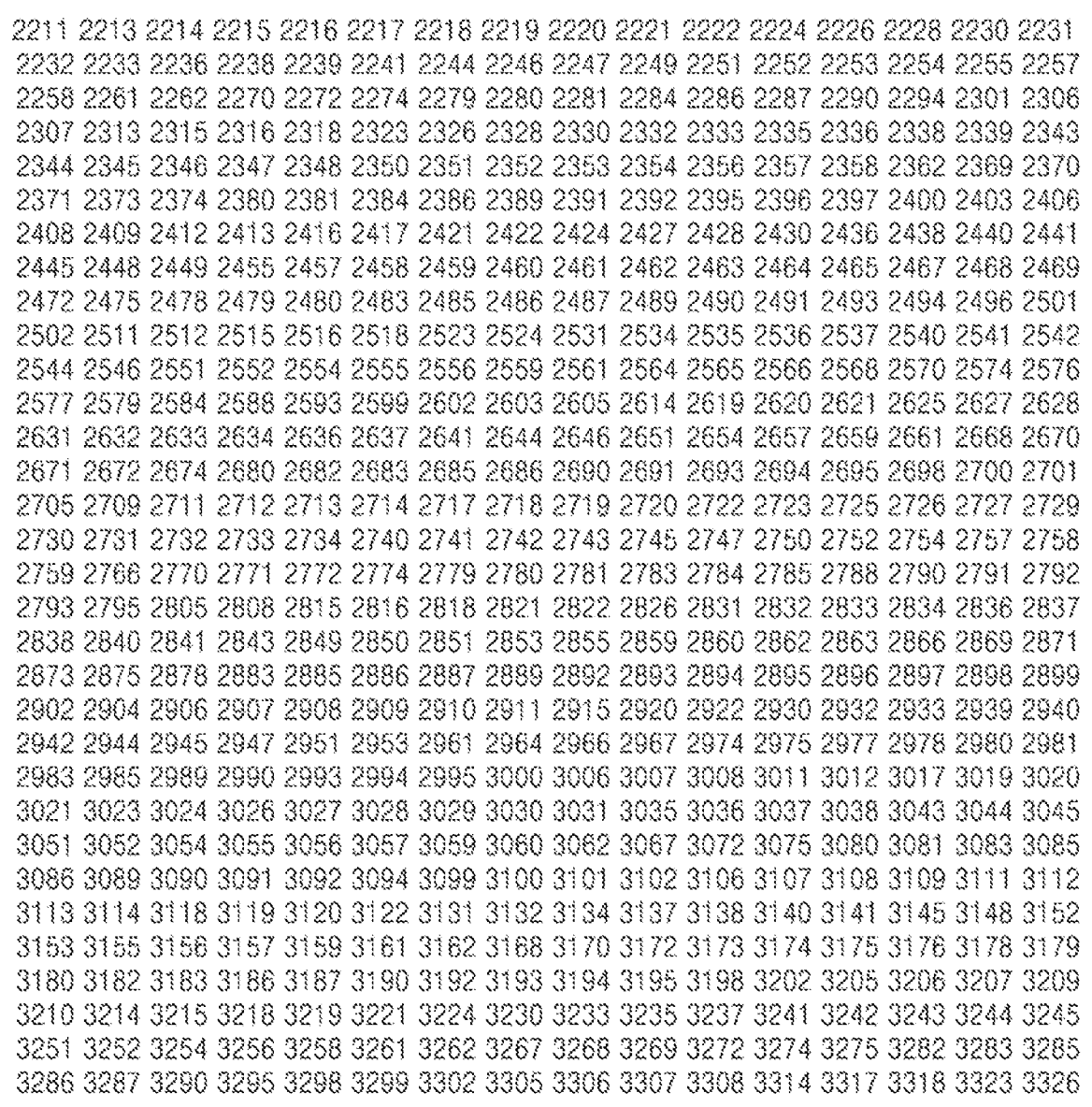

FIGS. 5A to 5C are diagrams illustrating examples of a plurality of candidate generators according to an exemplary embodiment of the inventive concept. Specifically, FIGS. 5A to 5C show a plurality of candidate generators divided for purposes of illustration in CRYSTALS-KYBER, which defines the prime number p, that is, 3329.

As shown in FIGS. 5A to 5C, there may be a total of 1536 candidate generators for the finite field GF(p) based on the prime number p of 3329. 1536 candidate generators may be smaller than the prime number p. The (p−1) remainders obtained by dividing each of the (p−1) numbers from the zero power to the (p−2) power of the candidate generator by the prime number p may correspond one-to-one to a set including numbers from 1 to (p−1). As described above with reference to FIG. 3, the processing circuit 140 may select one of 1536 candidate generators based on a random number RN, and such a randomly selected generator may be used to create at least one lookup table LUT for modular multiplication, for example, the first lookup table LUT1 and the second lookup table LUT2 of FIG. 4.

Figure 6:
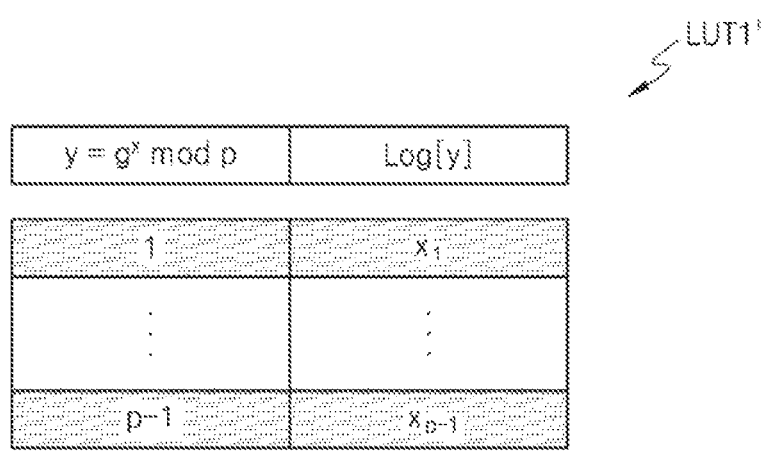
FIG. 6 is a diagram illustrating a lookup table, according to an exemplary embodiment of the inventive concept.

FIG. 6 is a diagram illustrating a lookup table according to an exemplary embodiment of the inventive concept. Specifically, FIG. 6 shows an example of the first lookup table LUT1 stored in the memory 400 of FIG. 4. As described above with reference to FIG. 4, the first lookup table LUT1' of FIG. 6 may include input and output pairs of the function Log defined in [Equation 4] as entries.

Referring to FIG. 6, the first lookup table LUT1' may include an output Log[y] of a function Log corresponding toy sequentially increasing from 1 to (p−1). For example, as shown in FIG. 6, the first lookup table LUT1' may include a pair of y, which is 1, and an output xi of a function Log corresponding to y, and include a pair of y, which is (p−1) and an output $x_{p-1}$ of the function Log corresponding to y. y (or a value converted from y) of the first lookup table LUT1' may correspond to an address of the memory 400 of FIG. 4, and the output of the function Log corresponding to y may correspond to data stored in the area accessed by the corresponding address.

Figure 7A:
FIGS. 7A and 7B are diagrams illustrating examples of a lookup table, according to exemplary embodiments of the inventive concept.
Figure 7B:

FIGS. 7A and 7B are diagrams illustrating examples of a lookup table according to exemplary embodiments of the inventive concept. Specifically, FIGS. 7A and 7B illustrate examples of the second lookup table LUT2 stored in the memory 400 of FIG. 4, respectively. As described above with reference to FIG. 4, the second lookup table LUT2' of FIG. 7A and the second lookup table LUT2" of FIG. 7B may include pairs of inputs and outputs of the function Exp defined in [Equation 3] as entries.

Referring to FIG. 7A, the second lookup table LUT2' may include an output Exp[x] of a function Exp corresponding to x sequentially increasing from 0 to (2p−4). As mentioned above, the output of the function Log defined by [Equation 4] may have a value of 0 to (p−2) (0≤Log[$g^i$ mod p]≤p−2), and accordingly, the value of the input "Log[a]+Log[b]" of the function Exp in [Equation 1] may have a value of 0 to (2p−4) (0≤Log[a]+Log[b]≤2p−4). Accordingly, the second lookup table LUT2' may include (2p−3) entries. For example, as shown in FIG. 7A, the second lookup table LUT2" may include a pair of x, which is zero, and output 1 of the function Exp corresponding to x, and a pair of x, which is (2p−4), and output "$g^{p-3}$ mod p" of the function Exp corresponding to x. x (or a value converted from x) of the second lookup table LUT2' may correspond to an address of the memory 400 of FIG. 4, and the output of the function Exp corresponding to x may correspond to data stored in the area accessed by the corresponding address. As shown in FIG. 7A, the outputs of the function Exp corresponding to x in (p−1) to (2p−4) may match the outputs of the function Exp corresponding x in zero to (p−3). Accordingly, the second lookup table LUT2 of FIG. 4 may have a reduced size like the second lookup table LUT2" of FIG. 7B.

Referring to FIG. 7B, the second lookup table LUT2" may include an output Exp[x] of a function Exp, corresponding to x sequentially increasing from 1 to (p−1). For example, as shown in FIG. 7B, the second lookup table LUT2" may include a pair of x, which is zero, and an output 1 of the function Exp corresponding to x, and a pair of x, which is (p−2), and an output "$g^{p-2}$ mod p" of the function Exp corresponding to x. x (or a value converted from x) of the second lookup table LUT2" may correspond to an address of the memory 400 of FIG. 4, and the output of the function Exp corresponding to x may correspond to data stored in the area accessed by the corresponding address. As shown in FIG. 7B, an example of an operation of referring to the second lookup table LUT2" including (p−1) entries will be described later with reference to FIG. 9.

Figure 8:
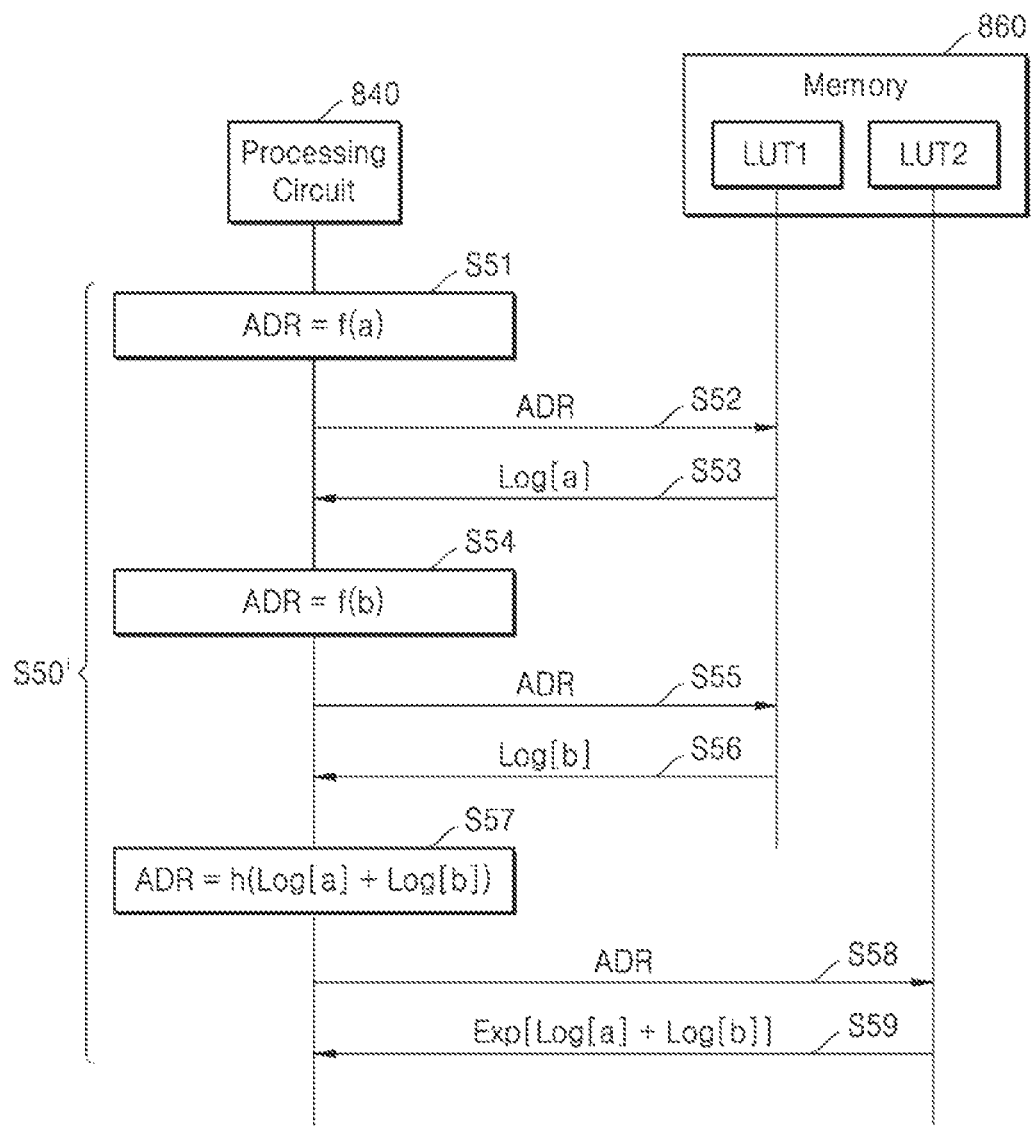
FIG. 8 is a message diagram showing a method for modular multiplication, according to an exemplary embodiment of the inventive concept.

FIG. 8 is a message diagram showing a method for modular multiplication according to an exemplary embodiment of the inventive concept. Specifically, the message diagram of FIG. 8 shows an example of operation S50 of FIG. 2. As described above with reference to FIG. 2, in operation S50' of FIG. 8, the processing circuit 840 may access the memory 860. As shown in FIG. 8, operation S50' may include a plurality of operations S51 to S59. As shown in FIG. 8, the memory 860 may include a first lookup table LUT1 and a second lookup table LUT2. For convenience of illustration, it is shown in FIG. 8 that the processing circuit 840 communicates with the first lookup table LUT1 and the second lookup table LUT2 included in the memory 860, respectively. The processing circuit 840 may access the memory 860 of FIG. 8.

Referring to FIG. 8, in operation S51, the processing circuit 840 may generate an address ADR based on a first input a. For example, as shown in FIG. 8, the processing circuit 840 may generate an address ADR from the first input a based on a predefined function f. The generated address ADR may be an address of an area in which an entry corresponding to the first input a is stored in the first lookup table LUT1. In some embodiments, as described above with reference to FIG. 4, the memory 860 may sequentially store entries of the first lookup table LUT1 (e.g., in the order shown in FIG. 6) from the area corresponding to the first address ADR1, and the function f may generate the address ADR by summing up the first address ADR1 and the address offset corresponding to the first input a.

In operation S52, the processing circuit 840 may provide the address ADR to the memory 860, and the memory 860 may receive the address ADR. In some embodiments, the processing circuit 840 may provide a read command to the memory 860 along with the address ADR. In operation S53, the memory 860 may provide the value included in the first lookup table LUT1 to the processing circuit 840. For example, the memory 860 may store the output Log[a] of the function Log corresponding to the first input a in the area of the first lookup table LUT1 corresponding to the address ADR, and as shown in FIG. 8, provide Log[a] to the processing circuit 840 in response to the address ADR. Herein, as in operation S52 and operation S53, the entire operation in which the processing circuit 840 provides an address to the memory 860 and the memory 860 provides data in response to the address may be referred to as a single access to the memory 860.

In operation S54, the processing circuit 840 may generate the address ADR based on the second input b. For example, similar to operation S51, the processing circuit 840 may generate an address ADR from the second input b based on a predefined function f. The generated address ADR may be an address of an area in which an entry corresponding to the second input b is stored in the first lookup table LUT1.

In operation S55, the processing circuit 840 may provide the address ADR to the memory 860, and the memory 860 may receive the address ADR. In some embodiments, the processing circuit 840 may provide a read command to the memory 860 along with the address ADR. In operation S56, the memory 860 may provide the value included in the first lookup table LUT1 to the processing circuit 840. For example, the memory 860 may store the output Log[b] of the function Log corresponding to the second input b in the area of the first lookup table LUT1 corresponding to the address ADR, and provide Log[b] to the processing circuit 840 in response to the address ADR, as shown in FIG. 8.

In some embodiments, operations S54 to S56 may be performed in parallel with operations S51 to S53. For example, the memory 860 may include a plurality of ports and may provide parallel accesses simultaneously. Accordingly, the processing circuit 840 accesses the memory 860 in parallel through the two ports to simultaneously acquire the output Log[a] of the function Log corresponding to the first input a and the output Log[b] of the Log corresponding to the second input b.

In operation S57, the processing circuit 840 may generate the address ADR based on the outputs Log[a] and Log[b] of the function Log. For example, as shown in FIG. 8, the processing circuit 840 may sum up Log[a] received in operation S53 and Log[b] received in operation S56, and generate an address ADR from the sum of Log[a] and Log[b] based on a predefined function h. The generated address ADR may be an address of an area in which an entry corresponding to the sum of Log[a] and Log[b] is stored in the second lookup table LUT2. In some embodiments, as described above with reference to FIG. 4, the memory 860 may sequentially store entries of the second lookup table LUT2 (e.g., in the order shown in FIG. 7A or 7B) from the area corresponding to the second address ADR2, and the function h may generate the address ADR by summing the second address ADR2 and an address offset corresponding to the sum of Log[a] and Log[b].

In some embodiments, when the second lookup table LUT2 includes (2p−3) entries as described above with reference to FIG. 7A, the processing circuit 840 may generate an address ADR corresponding to one of the (2p−3) entries. In addition, in some embodiments, when the second lookup table LUT2 includes (p−1) entries as described above with reference to FIG. 7B, the processing circuit 840 may generate an address ADR corresponding to one of the (p−1) entries. When the second lookup table LUT2 includes (p−1) entries, an example of operation S57 will be described later with reference to FIG. 9.

In operation S58, the processing circuit 840 may provide the address ADR to the memory 860, and the memory 860 may receive the address ADR. In some embodiments, the processing circuit 840 may provide a read command to the memory 860 along with the address ADR. In operation S59, the memory 860 may provide the value included in the second lookup table LUT2 to the processing circuit 840. For example, the memory 860 may store an output Exp[Log[a]+Log[b]] of the function Exp corresponding to the sum of Log[a] and Log[b] in the area of the second lookup table LUT2 corresponding to the address ADR and provide Exp[Log[a]+Log[b]] to the processing circuit 840 in response to the address ADR, as shown in FIG. 8.

Figure 9:
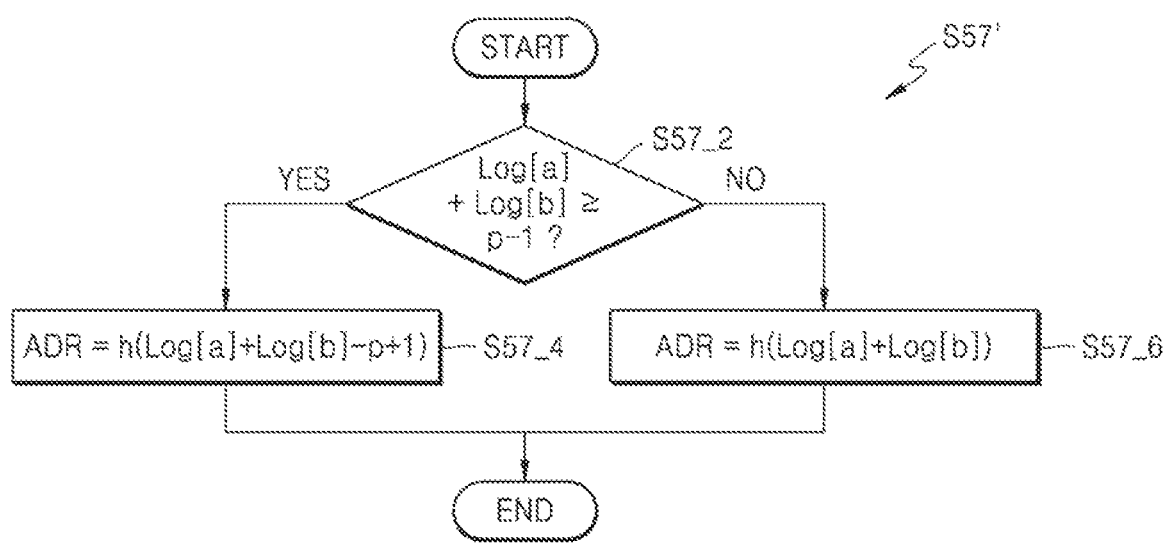
FIG. 9 is a flowchart showing a method for modular multiplication, according to an exemplary embodiment of the inventive concept.

FIG. 9 is a flowchart showing a method for modular multiplication according to an exemplary embodiment of the inventive concept. Specifically, the flowchart of FIG. 9 shows an example of operation S57 of FIG. 8. As described above with reference to FIG. 8, the address ADR may be generated based on the outputs Log[a] and Log[b] of the function Log in operation S57' of FIG. 9. As shown in FIG. 9, operation S57' may include operation S57_2, operation S57_4, and operation S57_6. In the example of FIG. 9, the processing circuit 820 of FIG. 8 may refer to the second lookup table LUT2" of FIG. 7B, and FIG. 9 will be described with reference to FIGS. 7B and 8.

Referring to FIG. 9, (p−1) and the sum of Log[a] and Log[b] may be compared in operation S57_2. As described above with reference to FIG. 7A, the outputs of the function Exp corresponding to inputs from (p−1) to (2p−4) may match the outputs of the function Exp corresponding to inputs from zero to (p−3). Accordingly, the processing circuit 840 may compare the sum of Log[a] and Log[b] with (p−1). As shown in FIG. 9, when the sum of Log[a] and Log[b] is greater than or equal to (p−1) (operation S57_2, YES), operation S57_4 may be performed subsequently, and when the sum of Log[a] and Log[b] is less than (p−1) (operation S57_2, NO), operation S57_6 may be subsequently performed.

When the sum of Log[a] and Log[b] is greater than or equal to (p−1) (operation S57_2, YES), the address ADR may be generated from Log[a], Log[b] and p based on the function h in operation S57_4. For example, as shown in FIG. 9, the processing circuit 840 may use a value obtained by subtracting (p−1) from the sum of Log[a] and Log[b] as an input of the function h. On the other hand, when the sum of Log[a] and Log[b] is less than (p−1) (operation S57_2, NO), the address ADR may be generated from the sum of Log[a] and Log[b] based on the function h in operation S57_6. Accordingly, the second lookup table LUT2" of FIG. 7B may have a reduced size.

FIG. 10 shows an example of a cryptographic operation according to an exemplary embodiment of the inventive concept. Specifically, FIG. 10 shows an example of a polynomial multiplication. For example, as described above, CRYSTALS-KYBER may require modular multiplications using a prime number p of 3329 as a modulus. Although a third-order polynomial is illustrated in FIG. 10, exemplary embodiments of the inventive concept are not limited thereto. Hereinafter, FIG. 10 will be described with reference to FIG. 1.

Referring to FIG. 10, multiplication of coefficients of a polynomial may be performed by multiplication of the polynomials. For example, as shown in FIG. 10, a third polynomial P3 may be generated by multiplying the first polynomial P1 by the second polynomial P2. The coefficients $a_0$, $a_1$, $a_2$, and $a_3$ of the first polynomial P1 may correspond to the secret key, and the coefficients $b_0$, $b_1$, $b_2$, and $b_3$ of the second polynomial P2 may correspond to a random number (i.e., a second random number).

The third polynomial P3 may be a third-order polynomial, such as the first polynomial P1 and the second polynomial P2. For this, a term having a power of 4 or more, that is, a term including $x^4$, $x^5$, or $x^6$, may be divided by $x^4$. Accordingly, the coefficients $c_0$, $c_1$, $c_2$, and $c_3$ of the third polynomial P3 may be calculated, as shown in FIG. 10, from the coefficients $a_0$, $a_1$, $a_2$, and $a_3$ of the first polynomial P1 and the coefficients $b_0$, $b_1$, $b_2$, and $b_3$ of the second polynomial P2. Specifically, as shown in the table of FIG. 10, in order to calculate the coefficients $c_0$, $c_1$, $c_2$, and $c_3$ of the third polynomial P3, a total of 16 modular multiplications may be required.

As shown in FIG. 10, each of the coefficients $a_0$, $a_1$, $a_2$, and $a_3$ of the first polynomial P1 may be used for four modular multiplications, and each of the coefficients $b_0$, $b_1$, $b_2$, and $b_3$ of the second polynomial P2 may also be used for four modular multiplications. Side-channel attacks may attempt hacking based on power consumption and/or electromagnetic fields generated by a plurality of modular multiplications, and accordingly, there is a risk of exposure of the coefficients $a_0$, $a_1$, $a_2$, and $a_3$ of the first polynomial P1 corresponding to the secret key. However, as described above with reference to the drawings, due to the memory being constantly accessed independently of the values of the inputs, in the 16 modular multiplications of FIG. 10, power consumption and electromagnetic fields may be equal. In addition, because the generator is randomly selected, different power consumption and/or electromagnetic fields may be generated even if the modular multiplication is repeated. Accordingly, the predictability of the coefficients $a_0$, $a_1$, $a_2$, and $a_3$ of the first polynomial P1 is significantly reduced, and the secret key is safely protected from side-channel attacks.

As described above with reference to FIG. 2, the update timing of at least one lookup table LUT may be determined in various ways. In some embodiments, the processing circuit 140 may generate a generator before performing each of the 16 modular multiplications illustrated in FIG. 10, and may create at least one lookup table LUT. Further, in some embodiments, the processing circuit 140 may generate a generator before performing the multiplication of the first polynomial P1 by the second polynomial P2, and may commonly use at least one lookup table LUT generated based on the same generator in 16 modular multiplications for multiplication of the first polynomial P1 by the second polynomial P2.

FIG. 11 is a block diagram showing devices according to an exemplary embodiment of the inventive concept. Specifically, the block diagram of FIG. 11 shows a first device 10 and a second device 20 communicating with each other through a communication link CL in a secure environment. The first device 10 and the second device 20 may be any device (e.g., a computing device) capable of performing the cryptographic operation described above with reference to the drawings. The communication link CL may be any appropriate communication channel that allows communication between or among one or more computing systems and/or devices, such as, for example, the first device 10 and the second device 20. The communication link CL may be wired, wireless, or any combination thereof.

The first device 10 may include a memory 11, at least one processor 13, an authentication logic 15, a cryptography logic 17, and a communication logic 19. Although not shown in FIG. 11, similar to the first device 10, the second device 20 may include a memory, at least one processor, an authentication logic, a cryptography logic, and a communication logic. Each of the components of the first device 10 (e.g., the authentication logic 15, the cryptography logic 17, and the communication logic 19, etc.) in a secure environment may be implemented as hardware, software, firmware, or a combination thereof. In some embodiments, each of the components of the first device 10 (e.g., the authentication logic 15, the cryptography logic 17, and the communication logic 19, etc.) may form at least one processor 13 or may be part of another hardware component. Further, in some embodiments, each of the components of the first device 10 (e.g., the authentication logic 15, the cryptography logic 17, and the communication logic 19, etc.) may be implemented as a circuit or electrical devices (e.g., authentication circuitry, cryptography circuitry, and communication circuitry). In addition, two or more components of the first device 10 (e.g., the authentication logic 15, the cryptography logic 17, and the communication logic 19, etc.) may be integrated into one component.

The at least one processor 13 may be implemented as a single or multiple core processor, a digital signal processor, a microcontroller, or another type of processor. The memory 11 may store various data and/or software used during the operation of the first device 10. For example, the memory 11 may be accessed by at least one processor 13 and may store an operating system (OS), an application, a program library, and/or software. In some embodiments, the memory 11 may include a secure area, and a secret key may be stored in the secure area. In addition, in some embodiments, the memory 11 may store at least one lookup table referenced during modular multiplication in the secure area.

The authentication logic 15 may perform various operations for authentication. For example, the authentication logic 15 may execute a hash function to generate a hash value of a message transmitted and received over the communication link CL. Further, the authentication logic 15 may generate a signature to be transmitted to the second device 20 or verify a signature received from the second device 20, based on the secret key and/or hash value. In some embodiments, the authentication logic 15 may perform modular multiplication upon generation and/or verification of a signature, and as described above with reference to the drawings, due to the modular multiplication that is resistant to side-channel attacks, the generation and/or verification of a signature may be safely performed.

The cryptography logic 17 may perform cryptographic and/or secure operations. In some embodiments, the cryptography logic 17 may be embedded in the first device 10 as a cryptographic engine, an independent secure co-processor, an accelerator included in at least one processor 13, or the like. Further, in some embodiments, the cryptography logic 17 may, despite its name, be embedded in the first device 10 as standalone software or firmware. In some embodiments, the cryptography logic 17 may perform modular multiplication when performing key generation, encryption and/or decryption, and as described above with reference to the drawings, key generation, encryption, and/or decryption may be safely performed due to the modular multiplication resistant to side-channel attacks.

The communication logic 19 may transmit a message and signature to the second device 20 through a communication link CL. A message transmitted through the communication link CL may not be encrypted or may be encrypted by the cryptography logic 17. Further, the communication logic 19 may provide a message and/or a signature received from the second device 20 through the communication link CL to the authentication logic 15 and/or the cryptography logic 17.

Figure 12A:
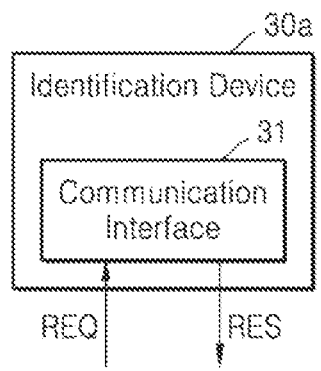
FIGS. 12A to 12C are block diagrams illustrating examples of a device for performing a cryptographic operation, according to exemplary embodiments of the inventive concept.
Figure 12B:
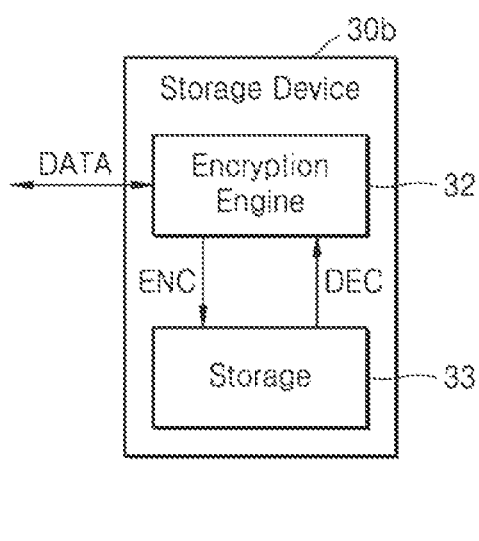
Figure 12C:
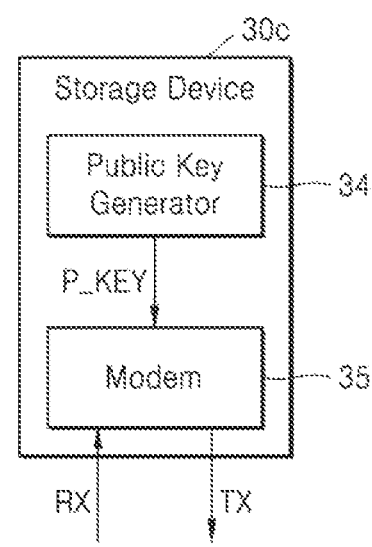

FIGS. 12A to 12C are block diagrams illustrating examples of a device for performing a cryptographic operation according to exemplary embodiments of the inventive concept. As described above with reference to the drawings, modular multiplication that is resistant to side-channel attacks may be performed, and accordingly, a cryptographic operation with a higher level of security may be provided.

Referring to FIG. 12A, the identification device 30a may include a communication interface 31. The identification device 30a may transmit a response RES including identification information of the identification device 30a to the outside in response to a request REQ received from the outside. For example, the identification device 30a may be a smart card, an RFID, or the like, and the identification information included in the response RES may be used to identify the user of the identification device 30a. The identification information included in the response RES may be encrypted by cryptography circuitry included in the communication interface 31.

Referring to FIG. 12B, a storage device 30b may include an encryption engine 32 and a storage 33. The storage device 30b may store the data DATA received from the outside or transmit the stored data DATA to the outside. The storage device 30b may encrypt data DATA received from the outside for security of stored data, and store encrypted data ENC encrypted by the encryption engine 32 in the storage 33. In addition, the encryption engine 32 may decrypt the encrypted data ENC read from the storage 33 and transmit the decrypted data DATA to the outside. For example, the storage device 30b may be a portable storage device or a storage device of a storage server.

Referring to FIG. 12C, a communication device 30c may include a public key generator 34 and a modem 35. The communication device 30c may communicate with another communication device by receiving the signal RX from the other communication device or transmitting the signal TX to the other communication device. The public key generator 34 may generate a public key P_KEY based on the secret key, and the modem 35 may transmit the encrypted signal TX or decrypt the signal RX, based on the public key P_KEY. That is, the communication device 30c may perform secure communication with another communication device, and for example, the communication device 30c may be a portable wireless communication device.

While the inventive concept has been particularly shown and described with reference to embodiments thereof, it will be understood that various changes in form and details may be made therein without departing from the spirit and scope of the following claims.

What is claimed is:

1. A device comprising:
 a random number generator configured to generate a random number;
 a memory configured to store at least one lookup table; and
 a processing circuit configured to generate a generator based on the random number, create the at least one lookup table based on the generator, and write the at least one lookup table to the memory,
wherein the processing circuit is configured to access the memory based on a first input and a second input, and generate a result of a modular multiplication of the first input by the second input based on the at least one lookup table, and
wherein the processing circuit is configured to obtain a plurality of candidate generators smaller than a modulus of the modular multiplication based on the modulus of the modular multiplication, and select one of the plurality of candidate generators based on the random number.

2. The device of claim 1, wherein the processing circuit is configured to access the memory a constant number of times independently of values of the first input and the second input.

3. The device of claim 1,
wherein the memory is configured to store the plurality of candidate generators, and
wherein the processing circuit is configured to read the generator from the memory based on the random number.

4. The device of claim 1, wherein each of the plurality of candidate generators corresponds to g such that a finite field GF(p) is to be a union of $\{g^i \bmod p; i=0, \ldots, p-2\}$ and $\{0\}$.

5. The device of claim 1,
wherein the modulus of the modular multiplication is 3329, and
wherein the processing circuit is configured to select one of 1536 candidate generators based on the random number.

6. The device of claim 1,
wherein the processing circuit is further configured to perform the modular multiplication, and
wherein the at least one lookup table is used for the modular multiplication.

7. The device of claim 1, wherein the at least one lookup table comprises:
a first lookup table including input and output pairs of a function $\text{Log}[g^i \bmod p]=i$ where the generator is g and a modulus of the modular multiplication is p; and
a second lookup table including input and output pairs of a function $\text{Exp}[i]=g^i \bmod p$.

8. The device of claim 7, wherein, when the first input is a and the second input is b, the processing circuit is configured to obtain values respectively corresponding to Log[a] and Log[b] from the first lookup table, obtain a value corresponding to Exp[Log[a]+Log[b]] from the second lookup table, and generate the result of the modular multiplication as the value obtained from the second lookup table.

9. The device of claim 8,
wherein each of the first lookup table and the second lookup table comprises (p−1) entries, and
wherein, when a sum of Log[a] and Log[b] is greater than or equal to (p−1), the processing circuit is configured to obtain a value corresponding to Exp[Log[a]+Log[b]−p+1] from the second lookup table, and generate the result of the modular multiplication as the value obtained from the second lookup table.

10. The device of claim 8, wherein, when the modulus is p, the first lookup table comprises (p−1) entries and the second lookup table comprises 2(p−1) entries.

11. The device of claim 1,
wherein the first input is a coefficient of a first polynomial,
wherein the second input is a coefficient of a second polynomial, and
wherein the result of the modular multiplication is used to calculate a coefficient of a polynomial obtained by multiplying the first polynomial by the second polynomial.

12. A method for modular multiplication of a first input and a second input, the method comprising:
generating a random number;
generating a generator based on the random number;
creating at least one lookup table based on the generator;
writing the at least one lookup table to a memory;
accessing the memory based on the first input and the second input; and
generating a result of the modular multiplication based on the at least one lookup table,
wherein the generating of the generator comprises:
obtaining a plurality of candidate generators smaller than a modulus of the modular multiplication based on the modulus of the modular multiplication; and
selecting one of the plurality of candidate generators based on the random number.

13. The method of claim 12, wherein the accessing of the memory is performed in the memory a constant number of times independently of values of the first input and the second input.

14. The method of claim 11, wherein the at least one lookup table comprises:
a first lookup table including input and output pairs of a function $\text{Log}[g^i \bmod p]=i$ where the generator is g and a modulus of the modular multiplication is p; and
a second lookup table including input and output pairs of a function $\text{Exp}[i]=g^i \bmod p$.

15. A non-transitory computer-readable recording medium including instructions executed by at least one processor, wherein the instructions cause the at least one processor to perform operations for modular multiplication of a first input and a second input, wherein the operations comprise:
generating a generator based on a random number;
creating at least one lookup table based on the generator;
writing the at least one lookup table to a memory;
accessing the memory based on the first input and the second input; and
generating a result of the modular multiplication based on the at least one lookup table,
wherein the generating of the generator comprises:
obtaining a plurality of candidate generators smaller than a modulus of the modular multiplication based on the modulus of the modular multiplication; and
selecting one of the plurality of candidate generators based on the random number.

16. The non-transitory computer-readable recording medium of claim 15, wherein the accessing of the memory is performed in the memory a constant number of times independently of values of the first input and the second input.

17. The non-transitory computer-readable recording medium of claim 15, wherein the at least one lookup table comprises:
a first lookup table including input and output pairs of a function $\text{Log}[g^i \bmod p]=i$ where the generator is g and the modulus of the modular multiplication is p; and
a second lookup table including input and output pairs of a function $\text{Exp}[i]=g^i \bmod p$.

* * * * *